(12) United States Patent
Peck et al.

(10) Patent No.: US 12,427,764 B2
(45) Date of Patent: Sep. 30, 2025

(54) PRINTING WITH MEDIA ROLL CHANGES AND NONPRODUCTION FRAMES

(71) Applicant: Hewlett-Packard Development Company, L.P., Spring, TX (US)

(72) Inventors: Thomas J. Peck, Corvallis, OR (US); Shane Shivji, Corvallis, OR (US); Claire O'Cull, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/596,853

(22) Filed: Mar. 6, 2024

(65) Prior Publication Data

US 2024/0208203 A1 Jun. 27, 2024

Related U.S. Application Data

(63) Continuation of application No. 17/777,433, filed as application No. PCT/US2019/067806 on Dec. 20, 2019, now Pat. No. 11,945,211.

(51) Int. Cl.
*B41J 11/42* (2006.01)
*B41F 33/00* (2006.01)
*G03G 15/00* (2006.01)

(52) U.S. Cl.
CPC .......... *B41F 33/0036* (2013.01); *B41J 11/42* (2013.01); *G03G 15/55* (2013.01)

(58) Field of Classification Search
CPC ......... B41J 11/42; B41J 11/663; B41J 11/008; B41J 15/042; B41J 11/00; B41J 11/001; B41J 11/0025; B41J 11/51; B41J 11/52; B41J 11/53; B41J 11/54; B41J 11/55; B41J 13/00; B41J 13/0009; B41J 13/0018; B41J 13/0027; B41J 13/0054; B41F 33/0036; B41F 13/60; B41F 33/0081; B41F 33/16;

(Continued)

(56) References Cited

U.S. PATENT DOCUMENTS 6,942,405 B1 9/2005 Chi et al.
7,092,119 B1 8/2006 Hinds et al.

(Continued)

FOREIGN PATENT DOCUMENTS

CN 202115092 U 1/2012
EP 2011649 A2 1/2009

(Continued)

*Primary Examiner* — Kristal Feggins
(74) *Attorney, Agent, or Firm* — Jordan IP Law, LLC

(57) ABSTRACT

In an example of the disclosure, first and second print jobs are received at a printer. The first and second print jobs each include production frames. The first and second print jobs are printed with a media roll change occurring during printing. A first finishing device information nonproduction ("FDIN") frame and a second FDIN frame are printed. The first and second FDIN frames include coded information regarding the first print job and the second print job, respectively. The coded information is for reading by a scanner at a finishing device. A press calibration nonproduction ("PCN") frame that includes a printer calibration diagnostic is printed. A scanner at the printer is caused to capture the printer calibration diagnostic. A calibration operation is performed at the printer utilizing data or attributes captured from the printer calibration diagnostic.

15 Claims, 9 Drawing Sheets

(58) Field of Classification Search
CPC ....... B41F 23/08; G03G 15/55; G06F 3/1217; G06F 3/126; G06F 3/1264; G06F 3/1282
See application file for complete search history.

(56) References Cited

U.S. PATENT DOCUMENTS

| | | |
|---|---|---|
| 7,489,422 B2 | 2/2009 | Zuber |
| 8,610,932 B2 | 12/2013 | Niles et al. |
| 8,625,129 B2 | 1/2014 | Noy et al. |
| 2004/0114157 A1 | 6/2004 | Linder et al. |
| 2009/0217835 A1 | 9/2009 | Rozenblum |
| 2013/0025488 A1 | 1/2013 | Suriol et al. |
| 2015/0183214 A1 | 7/2015 | Yasuzaki |
| 2018/0093497 A1 | 4/2018 | Van Bekkem et al. |
| 2020/0394002 A1 | 12/2020 | Blanco Gabella |

FOREIGN PATENT DOCUMENTS

| | | |
|---|---|---|
| JP | 2001-051362 A | 2/2001 |
| WO | 2019/172912 A1 | 9/2019 |

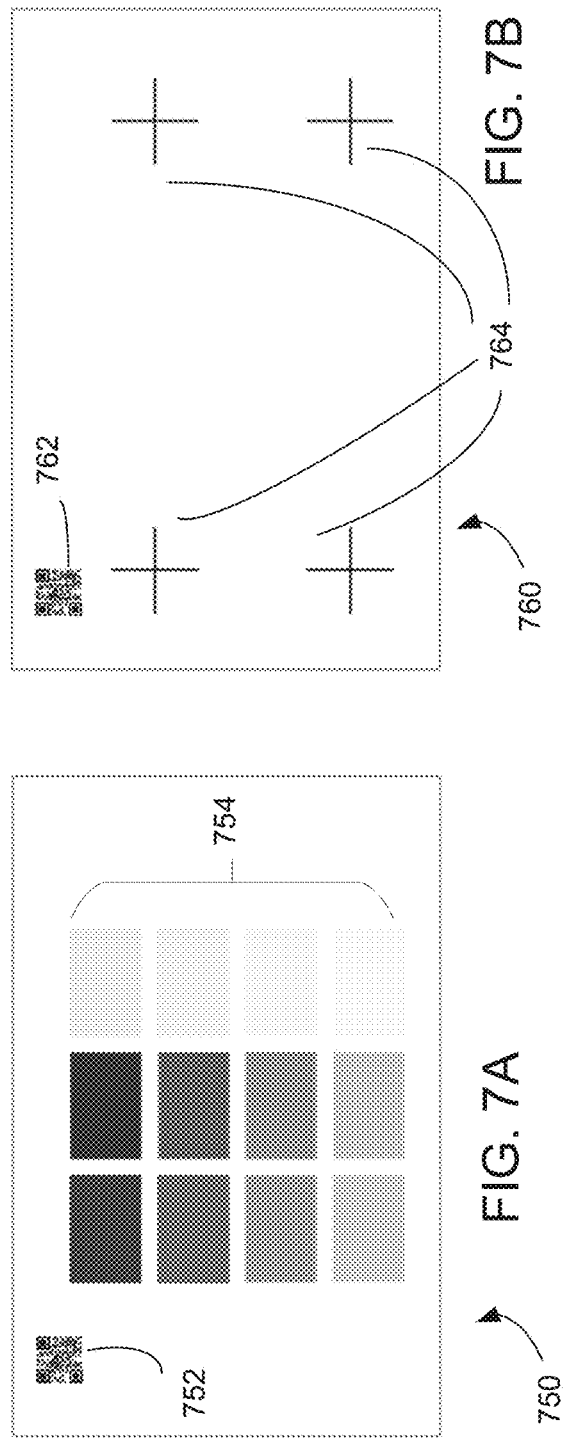
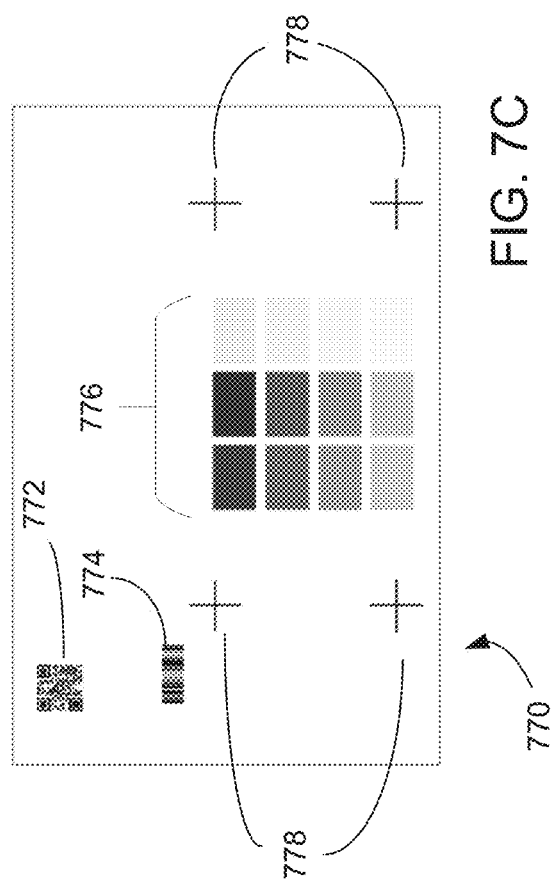
FIG. 7A
FIG. 7B
FIG. 7C

PRINTING WITH MEDIA ROLL CHANGES AND NONPRODUCTION FRAMES

CROSS-REFERENCE TO RELATED APPLICATIONS

The present application is a continuation of U.S. patent application Ser. No. 17/777,433 (filed on May 17, 2022), which is a National Stage Entry of PCT/US2019/067806 (filed Dec. 20, 2019), all of which are hereby incorporated by reference in their entirety.

BACKGROUND

A printer may apply marking agents to a paper or another media to produce an image upon the media. One example of printer is a web-fed printer device, wherein during production printing marking agent application components apply the marking agents to a web media fed to the printer device by a supply roll. In certain examples, the print application components may apply the marking agent via inkjet (e.g., thermal inkjet or piezo inkjet) or dry toner printing technologies. In other examples, the print application components may apply to the media an electrostatic printing fluid (e.g., electrostatically chargeable toner or resin colorant particles dispersed or suspended in a carrier fluid). Following the application of the marking agents, the web media may be collected on a take-up roll or cut into sheets by a finishing device that is in-line with the printer.

DRAWINGS

FIGS. 7A-7C are simple schematic diagrams that illustrate examples of a finishing device information nonproduction frame having an instruction for modification of a finishing device.

DETAILED DESCRIPTION

Figure 1:
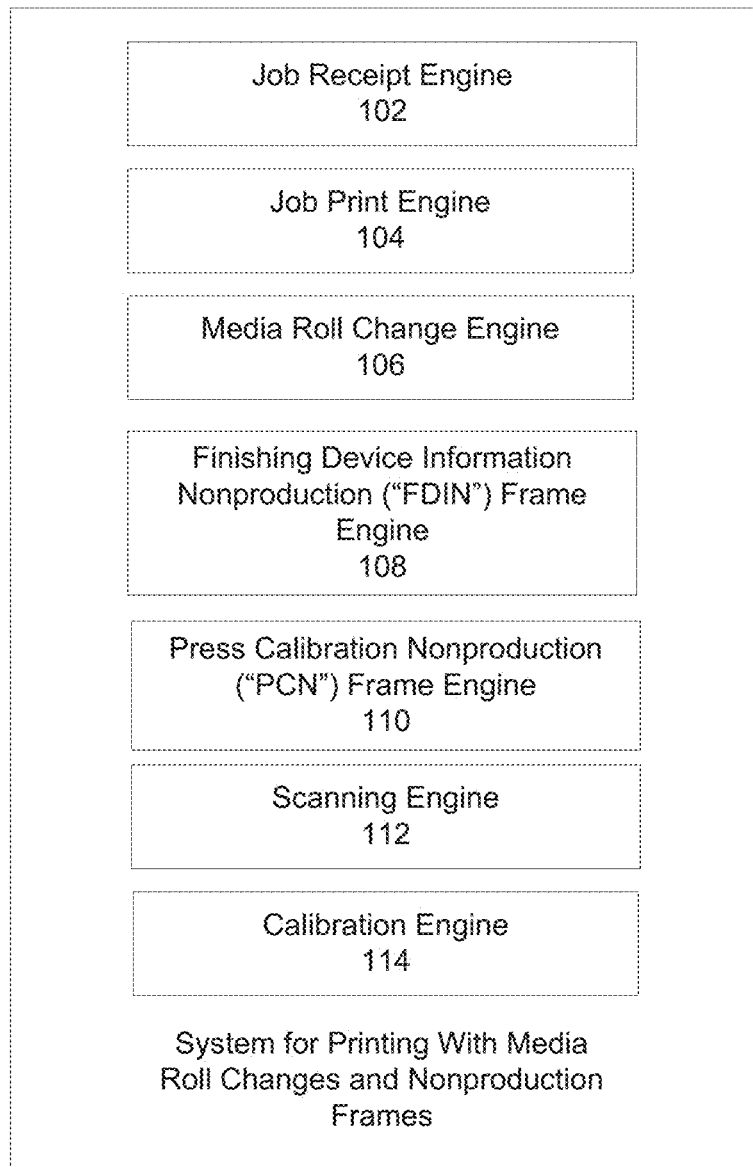
FIG. 1 is a block diagram depicting an example of a system for printing with media roll changes and nonproduction frames.

Commercial print jobs are often printed one after the other at a web-fed printer device. This printing of multiple jobs in succession can cause a problem on finishing devices (e.g., a cutter device, a folder device, a stapler device) if different finishing device actions (e.g., cutting at different locations) are to be performed with respect to print job. This is often corrected either by stopping the press between jobs or inserting "throw-away" user content between jobs or printing extra. These existing solutions can waste user time, printer time, and supplies (e.g. the web media). The waste of time and resources can be exacerbated when the jobs have complicated finishing and/or printing is to occur utilizing multiple web media supply or take-up rolls.

To address these issues, various examples described in more detail below provide a system and a method for printing with media roll changes and nonproduction frames. In an example of the disclosure, a printer includes a set of printheads or other marking agent application components to form images upon a web media in accordance with a received print job. The printer includes a media transport component to cause movement of the web media past the printer's marking agent components, and a scanner. The printer includes a controller that is to receive first and second print jobs. The controller is to determine a media roll change is to occur during printing, and cause printing of the first and second print jobs with the media roll change. The controller is to cause printing of a finishing device information nonproduction frame for each of the first and second print jobs, with each finishing device information nonproduction frame including coded information to be read at a finishing device. The coded information is for modifying a setting of the cutting finishing device. The controller is to cause printing of a press calibration nonproduction frame that includes a printer calibration diagnostic. The controller is to cause a calibration at the printer utilizing data or attributes from the printer calibration diagnostic. The calibration is to modify or verify a printer setting for the second print job. In examples, the media roll change is to occur without interrupting printing of the first and second print jobs, and wherein no portion of the first or second print job, the finishing device information nonproduction frame, or the press calibration nonproduction frame is to be printed on a splice line. In examples, the media roll change may include splicing media from a first supply roll to a second supply roll. In examples, the media roll change may include a splicing of media from a first take-up roll to a second take-up roll. In examples, the controller may determine that the media roll change is to occur during printing based upon a received print job manifest, an observed limitation of available media at a supply roll, and an observed limitation of capacity at a take-up roll.

In this manner, the disclosed method and system enable a printer to automatically and continuously print jobs utilizing multiple supply and take-up rolls, where the finished rolls are optimized for continued processing at a finishing device. Printing of the nonproduction frames with the production frames of the print jobs allows for the avoidance of splices in production content. The printing of the nonproduction frames additionally enables provision of job finishing instructions to finishing devices and printer set up for a next print job without requiring operator intervention. Users and providers of printer systems will appreciate the reductions in production printing downtime and reductions in supplies waste reductions afforded by the disclosed examples. Installations and utilization of printers that include the disclosed method and system should thereby be enhanced.

FIG. 1 depicts an example of physical and logical components for implementing various examples. In FIG. 1 various components are identified as engines 102, 104, 106, 108, 110, 112, and 114. In describing engines 102-114 focus is on each engine's designated function. However, the term engine, as used herein, refers generally to hardware and/or programming to perform a designated function. As is illustrated with respect to FIG. 2, the hardware of each engine, for example, may include one or both of a processor and a memory, while the programming may be code stored on that memory and executable by the processor to perform the designated function.

FIG. 1 is a block diagram depicting an example of a system 100 for printing with media roll changes and non-production frames. In this example, system 100 may include a job receipt engine 102, representing generally a combination of hardware and programming to receive at a printer a set of print jobs, wherein each print job includes a set of production frames.

As used herein, "printer" and "printing device" are used synonymously and refer generally to any electronic device or group of electronic devices that consume a marking agent to produce a printed print job or form an image upon a media. As used herein, "marking agent" refers generally to any substance that can be applied upon a media by a printer during a printing operation to form an image upon a media, including but not limited to an ink. In examples, a printer may be, but is not limited to, a liquid inkjet printer, a liquid toner-based printer, a LEP printer that utilizes electrostatic printing fluid and a blanket, or a dry toner printing device. The term "printer" includes a multifunctional device that performs a function such as scanning and/or copying in addition to printing. As used herein, a "job" and "print job" are used synonymously and refer generally to content, e.g., an image, and/or instructions as to formatting and presentation of the content to be sent to a printer for printing. In examples, a print job may be stored in a programming language and/or a numerical form so that the job can be stored and used in computing devices, servers, printers and other machines capable of performing calculations and manipulating data. As used herein, an "image" refers generally to a rendering of an object, scene, person, or abstraction such text or a geometric shape.

As used herein, "media", "print media", and "media" are used synonymously and refer generally to an article or object on which a printed image can be formed. As used herein, "web media", "web substrate", and "web" are used synonymously and refer generally to a media that is to pass through a printer as a continuous length. As used herein, a "frame" refers generally to a specified length or incidence of a web media. In examples, a frame may be a "production frame", a "non-production frame", or a blank frame. As used herein, a "production frame" refers generally to a length or incidence of the web media upon which an image from the print job is to be printed, wherein all or a portion of that frame is, or is to be incorporated in a finished product. Examples of production frames include, but are not limited to, frames that will be printed for use, reading, consumption, or enjoyment by an end user such as packaging labels, direct mail circulars, financial or account statements, pages of a book or magazine, and photographs. It should be noted that a frame that includes an image from the print job that is to be incorporated in a finished product is a "production frame" notwithstanding the inclusion of instructions (e.g., calibration marks, or coded instructions contained in the margins of the frame that are to trimmed away) for affecting a setting of the printer, or of a finishing device or other apparatus downstream of the printer. As used herein, a "non-production frame" refers generally to a length or incidence of the web media that, in contrast to a production frame, does not include an image from the print job that is to be incorporated in a finished product. As used herein a "finishing device" refers generally to any non-printing device that is to perform an operation upon already printed upon media. In examples, the operation may be cutting, folding, stapling, corrugation assembly, or any other finishing operation.

Continuing with the example of FIG. 1, system 100 may include a job print engine 104 representing generally a combination of hardware and programming to cause printing of the set of print jobs. In examples, print job engine 104 may include inkjet printheads (e.g., thermal inkjet or piezo printheads). In other examples may print job engine 104 may include components for depositing liquid toner, LEP toner, or dry toner upon a media (e.g. a photoconductive drum, a developer unit, and/or an intermediate transfer blanket).

Media roll change engine 106 represents generally a combination of hardware and programming to cause a media roll change to occur during printing of the set of print jobs. As used herein, "media roll", "web media roll", and "roll" are used synonymously and refer generally a winding of web media upon a drum, tube, or other structure. Typically, a web media is fed from a supply roll at one end of the printer, through a print zone. In examples, after application of marking agent, the web media may be wound upon a take-up roll at the opposite end of the printer. In examples, certain pre-printing events (e.g., application of primer) and/or post-print processing events (e.g., drying, application of overcoats, etc.) may occur at the printer, in addition to application of marking agent, to affect the web media before its collection at the take-up roll.

In one example, media roll change engine 106 may determine the media roll change is to occur during printing based upon received data. In an example, media roll change engine 106 may determine the media roll change is to occur based upon receipt of data indicative of print job manifest. In a particular example, the print job manifest may be received at the printer along, with, or as part of the received first and second print jobs. In another example, a determination of a media roll change event to occur may be based upon observed, e.g. via a scanner or encoder at the printer, limitation of available media at a supply roll. In another example, a determination of the media roll change event is to occur is based upon receipt of data indicative of an observed limitation of capacity at a take-up roll.

In examples, media roll change engine 106 determining a media roll change is to occur may include establishing points during the printing operation where the web media is to be spliced to accomplish a media roll change. As used herein, to "splice" a first and a second media refers generally to combine the first and second media. In an example, a first and second media may be spliced by overlapping and binding ends of the first and second medias. In examples, a splicing operation may include a cutting step. As will be discussed in detail in this disclosure, in examples the determined media roll change may be or include a change of supply rolls (including a splicing from a first supply roll to a second supply roll), a change of take-up rolls (including splicing from a first take-up roll to a second take-up roll), or both.

Continuing with the example of FIG. 1, system 100 may include a finishing device information nonproduction ("FDIN") frame engine 108, to cause printing of a FDIN frame for each of the first and second print jobs. Each of the FDIN frames of the set includes coded information regarding the first print job and the second print job, respectively. This coded information is for reading by a scanner at a finishing device that is downstream to the printer in terms of workflow. In some examples the finishing device may be in-line and downstream to the printer, such that the finishing device is downstream to the printer in terms of physical positioning and workflow. In other examples the finishing device may be physically separate and not in-line with respect to the printer, such that the finishing device is downstream to the printer in terms of workflow, but not physical positioning.

Modifying the finishing device based upon the scanner-read coded information may include informing the finishing device of an attribute of a production frame of the first and/or second print jobs. Modifying the finishing device based upon the scanner-read coded information may additionally include modifying settings of the finishing device to perform a post-printing action upon the subject production frame. In a particular example, the downstream finishing device may be a cutting finishing device, and the post-printing action to be performed is a cutting action upon the web media to create separate printed articles.

Continuing with the example of FIG. 1, system 100 may include a press calibration nonproduction ("PCN") frame engine 110, to cause printing of a PCN frame that includes a printer calibration image. Each of the PCN frames of the set includes a printer calibration diagnostic. As used herein, a "calibration diagnostic", "diagnostic", "diagnostic image", and "calibration image" are used synonymously and refer to a printed image that includes a target, or set of targets, or a pattern of targets that are to be placed in the focal plane of a sensor for measurement. In examples, the target may be a reference point for measuring color characteristics of a printed image, e.g., optical density, hue, saturation, lightness, gloss). In examples, the target may be or include a rectangle, oval, line segment, dot, spot, cross, or any other geometrical shape or other visual feature that can serve as fiducials for assessing correctness of printed image registration. In examples the calibration image may include multiple targets for assessing color characteristics. In examples the calibration image may include multiple targets for assessing correctness of image registration. In examples the calibration image may include a target for assessing color characteristics and a target for assessing correctness of image registration. In examples the calibration image may include a target that is for both assessing color characteristics and assessing correctness of image registration.

Continuing with the example of FIG. 1, system 100 may include a scanning engine 112, to cause a scanner to capture the printer calibration diagnostic and create scan data representative of the printer calibration diagnostic. As used herein, "scanner" refers generally to an electromechanical device that is to capture an image of a subject and convert that subject into digital form for storage or processing. In examples, the scanner may be an optical sensor included within the printer and situated in the media path.

System 100 may include a calibration engine 114, to perform a calibration operation at the printer based upon the scan data. In an example, the scanner may be utilized to capture the printer calibration diagnostic and calibration engine 114 may perform a calibration operation based upon data or information read from the diagnostic. In an example, the calibration operation may be to modify a setting of the printer for one of the print jobs of the set of print job (e.g. the current print job, or a next print job to be printed). Settings to be modified may include, but are not limited to, positioning of printer components, ink selection, media selection, and glossiness for the current or the next print job. In an example, the calibration operation may be an image registration calibration specific to the current print or the next print job. In another example, the calibration may be a color accuracy calibration specific to the current print job or a next print job.

In other examples, the calibration operation may be a verification calibration. As used herein, a "verification calibration" refers generally to a calibration that is general or routine in the sense that the calibration is not specific to the demands of a specific print job. In an example, the verification calibration operation may be a general image registration calibration. In another example, the verification calibration may be a general color accuracy calibration.

In the foregoing discussion of FIG. 1, job receipt engine 102, job print engine 104, media roll change engine 106, FDIN frame engine 108, PCN frame engine 110, scanning engine 112, and calibration engine 114 were described as combinations of hardware and programming. Engines 102-114 may be implemented in a number of fashions. Looking at FIG. 2 the programming may be processor executable instructions stored on a tangible memory resource 230 and the hardware may include a processing resource 240 for executing those instructions. Thus, memory resource 230 can be said to store program instructions that when executed by processing resource 240 implement system 100 of FIGS. 1 and 2.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may be separate but accessible to that device and processing resource 240.

In one example, the program instructions can be part of an installation package that when installed can be executed by processing resource 240 to implement system 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

Figure 2:
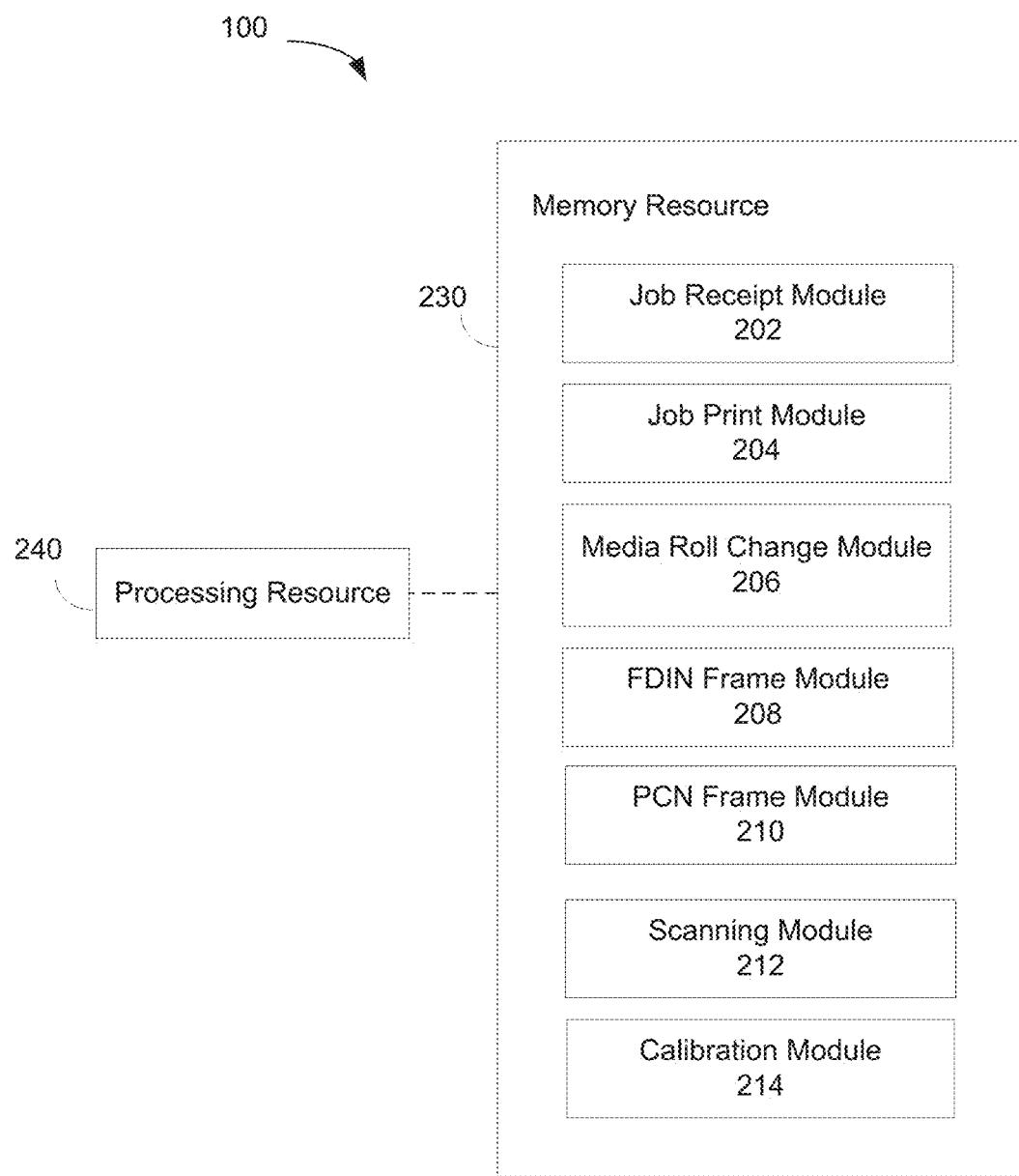
FIG. 2 is a block diagram depicting a memory resource and a processing resource to implement an example of a method for printing with media roll changes and nonproduction frames.

In FIG. 2, the executable program instructions stored in memory resource 230 are depicted as job receipt module 202, job print module 204, media roll change module 206, FDIN frame module 208, PCN frame module 210, scanning module 212, and calibration module 214. Job receipt module 202 represents program instructions that when executed by processing resource 240 may perform any of the functionalities described above in relation to job receipt engine 102 of FIG. 1. Job print module 204 represents program instructions that when executed by processing resource 240 may perform any of the functionalities described above in relation to jo print engine 104 of FIG. 1. Media roll change module 206 represents program instructions that when executed by processing resource 240 may perform any of the functionalities described above in relation to media roll change engine 106 of FIG. 1. FDIN frame module 208 represents program instructions that when executed by processing resource 240 may perform any of the functionalities described above in relation to FDIN frame engine 108 of FIG. 1. PCN frame module 210 represents program instructions that when executed by processing resource 240 may perform any of the functionalities described above in relation to PCN frame engine 110 of FIG. 1. Scanning module 212 represents program instructions that when executed by processing resource 240 may perform any of the functionalities described above in relation to scanning engine 112 of FIG. 1. Calibration module 214 represents program instructions that when executed by processing resource 240 may perform any of the functionalities described above in relation to calibration frame engine 114 of FIG. 1.

Figure 3:
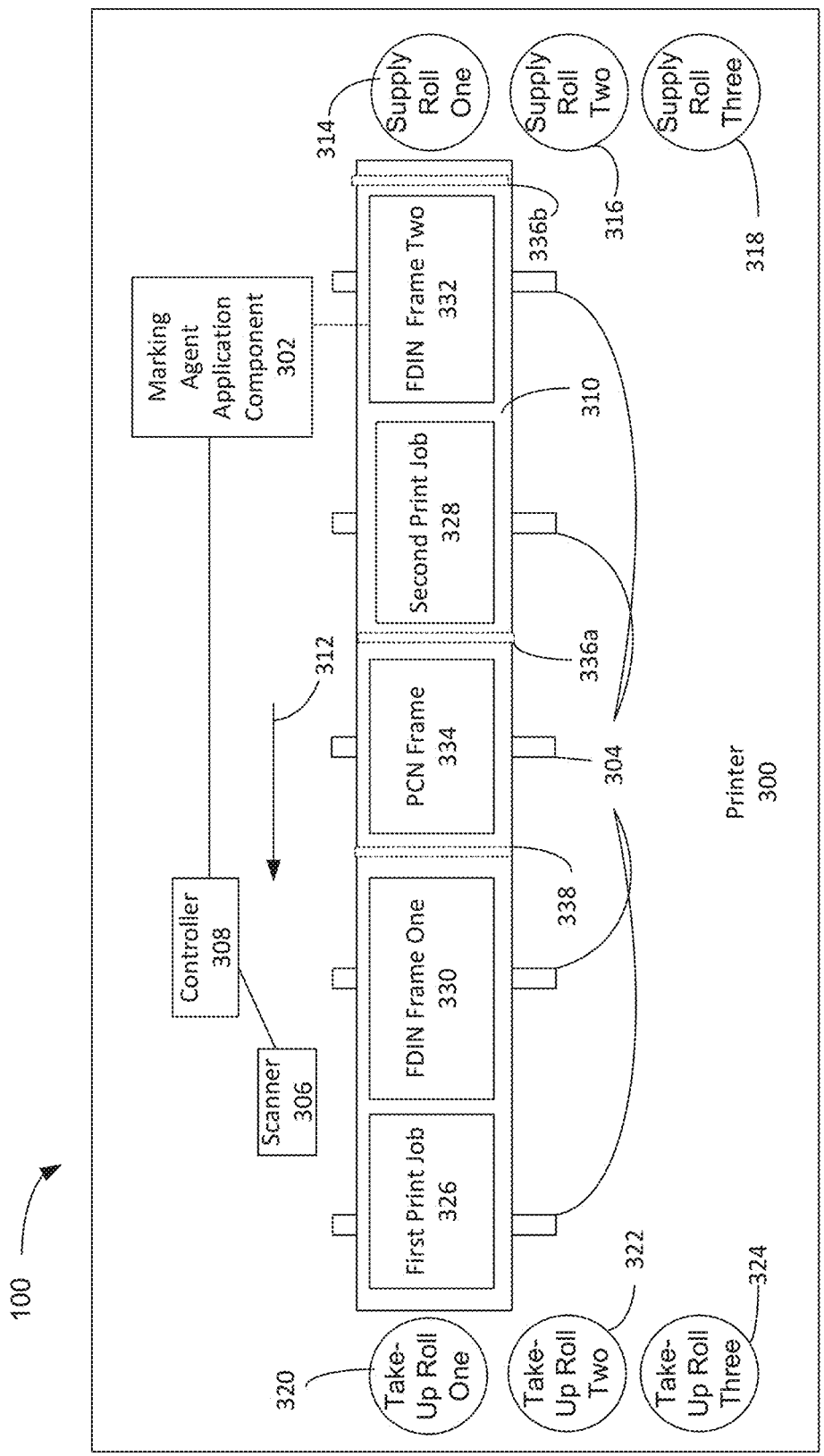
FIG. 3 is a simple schematic diagram that illustrates an example of a system for printing with media roll changes and nonproduction frames.

FIG. 3 is a simple schematic diagram that illustrates an example of a system 100 for printing with media roll changes and nonproduction frames. In this example, a printer 300 includes a marking agent application component 302, a media transport component 304, a scanner 306, and a controller 308. In this example, printer 300 is to print upon a web media 310, wherein the web media can be fed to or though printer 300 in a web direction 312 from supply roll one 314, supply roll two 316, and/or supply roll three 318. After moving past marking agent application component 302 and through printer 300, the web media 310 may be collected upon one or more of take-up roll one 320, take-up roll two 322, and take-up roll three 324.

Marking agent application component 302 is to form images upon the web media 310 in accordance with received print jobs. In a particular example, marking agent application component 302 may be a set of inkjet printheads situated upon a series of print bars, wherein each printbar is to apply marking agent of a certain color to the print media. In examples, the printheads may be thermal inkjet printheads or piezo printheads.

Media transport components 304 may include a set of rollers and are to cause movement of web media 310 in the web direction 312 past the marking agent application component during a printing operation. In examples, rollers from the set of rollers may be formed from a plastic, a rubber-based substance, a metal, or any other durable material formed in a cylindrical shape with a smooth surface for interfacing with the web substrate.

Scanner 306 may be an optical sensor positioned at printer 300 and adjacent to web media 310 to face the web media. In the example of FIG. 3, controller 308 represents a combination of hardware and programming that is to control part, or all, of the components and print process at printer 300, including controlling system 100 for printing with media roll changes and nonproduction frames at printer 300.

Continuing with the example of FIG. 3, controller 308 is to receive a first print and a second print job for printing. Controller 308 is to determine a media roll change is to occur during the printing of the first and second print jobs. In examples the media roll change may be, or include, one or more supply roll changes as between supply roll one 314, supply roll two 316, and supply roll three 318. In a particular example, the supply media roll change may include splicing media so as to switch media feeding as between any of supply roll one 314, supply roll two 316, and supply roll three 318, the splicing creating one or more splice lines 336a 336b in the web media 310. In examples, the supply roll changes are to occur without interrupting printing of the first and second print jobs 326 328, and such that no portion of a production frame of the first and second print jobs 326 328, a FDIN frame (e.g., FDIN frame one 330 or FDIN frame two 332), or a PCN frame (e.g. PCN frame 334) is to be printed on a splice line.

Continuing at FIG. 3, in examples the media roll change may be, or include, one or more take-up roll changes as between take-up roll one 320, take-up roll two 322, and take-up roll three 324. In a particular example, the take-up media roll change may include splicing media to switch media collection as between any of take-up roll one 320, take-up roll two 322, and take-up roll three 324. In examples, the take-up roll changes are to occur without interrupting printing of the first and second print jobs 326 328, and such that no portion of a production frame of the first and second print jobs 326 328, a FDIN frame (e.g., FDIN frame one 330 or FDIN frame two 332), or a PCN frame (e.g. PCN frame 334) is to be printed on a splice line In examples the media roll change may be include a supply roll change and a take-up roll change. In examples, controller may determine the media roll change based upon receipt of a print job manifest or other a indicative of a change of media types as between the first print job 326 and the second print job 328, receipt of data indicative of a limitation of available media at a supply roll, and/or receipt of data indicative of a limitation of capacity at a take-up roll. Controller is to cause marking agent application component 302 to print the first print job 326 and the second print job 328 upon the media 310 with the determined media roll change.

In the example of FIG. 3, controller 308 is to cause the marking agent application component to print a FDIN frame one 330 and a FDIN frame two 332 upon the media 310. In this example, FDIN frame one 330 includes coded information to be read at a finishing device (not shown in FIG. 3), the coded information for modifying a setting of the finishing device with respect to the printed first print job 326. FDIN frame two 332 includes coded information to be read at the finishing device, the coded information for modifying a setting of the finishing device with respect to the printed second print job 328.

The coded information is to be read at a scanner at the finishing device, so as to cause the modification of the finishing device. In examples, the modification of the finishing device may change in settings of the finishing device to act upon the printed first print job 326 and second print job 328 (e.g., settings for a cutting, folding, stapling, or sorting action to be taken by the finishing device). In particular examples, the coded information included within FDIN frame one 330 and/or FDIN frame two 332 may include diagnostic or calibration patterns. In these particular examples the modification of the finishing device may be a change in settings based upon a calibration operation at the finishing device that utilizes the diagnostic or calibration patterns.

Continuing at FIG. 3, controller 308 is to cause printer 300 to print a PCN frame 334 that includes a printer calibration diagnostic. In this example PCN frame 334 is printed after the printing of the first print job 326 and FDIN frame one 330, and before the printing of the second print job 328 and FDIN frame two 332. Controller 308 causes scanner 306 to scan the printer calibration diagnostic included in PCN frame 334 and generate scan data representative of the printer calibration diagnostic. Controller 214 in turn causes a calibration operation to be performed at printer 300 utilizing the scan data. In a particular example, the calibration operation is an operation to modify or verify a printer setting for the printer's 300 printing of second print job 328.

In a particular example, the media roll change may be a change from a first take-up roll (e.g., take-up roll one 320) to a second take-up roll (e.g., take-up roll two 322) with the media roll change including splicing of the media 310 at a splice line, e.g., splice line 338. The first print job 326 is printed upon the media 310 ahead of the splice line 338. The FDIN frame one 330 is printed upon the media 310 after the printing of the first print job 326 and ahead of the splice line 338. In this manner, when the media of the first take-up roll (take-up roll one 320) is unwound at a finishing device, the FDIN frame one 330 will precede the first print job 326. The finishing device can then utilize a scanner at the finishing device to read the coded information of FDIN frame one 330 to provide finishing instructions (e.g., cutting, folding, sorting, or stapling) applicable to the first print job 326 to the finishing device. In examples the finishing device will utilize the finishing instructions to adjust the finishing device. In examples, adjusting the finishing device may include informing the finishing device of an attribute of a subject production frame of the first print job 326, and modifying settings of the finishing device to perform a post-printing action upon the subject production frame.

Figure 4:
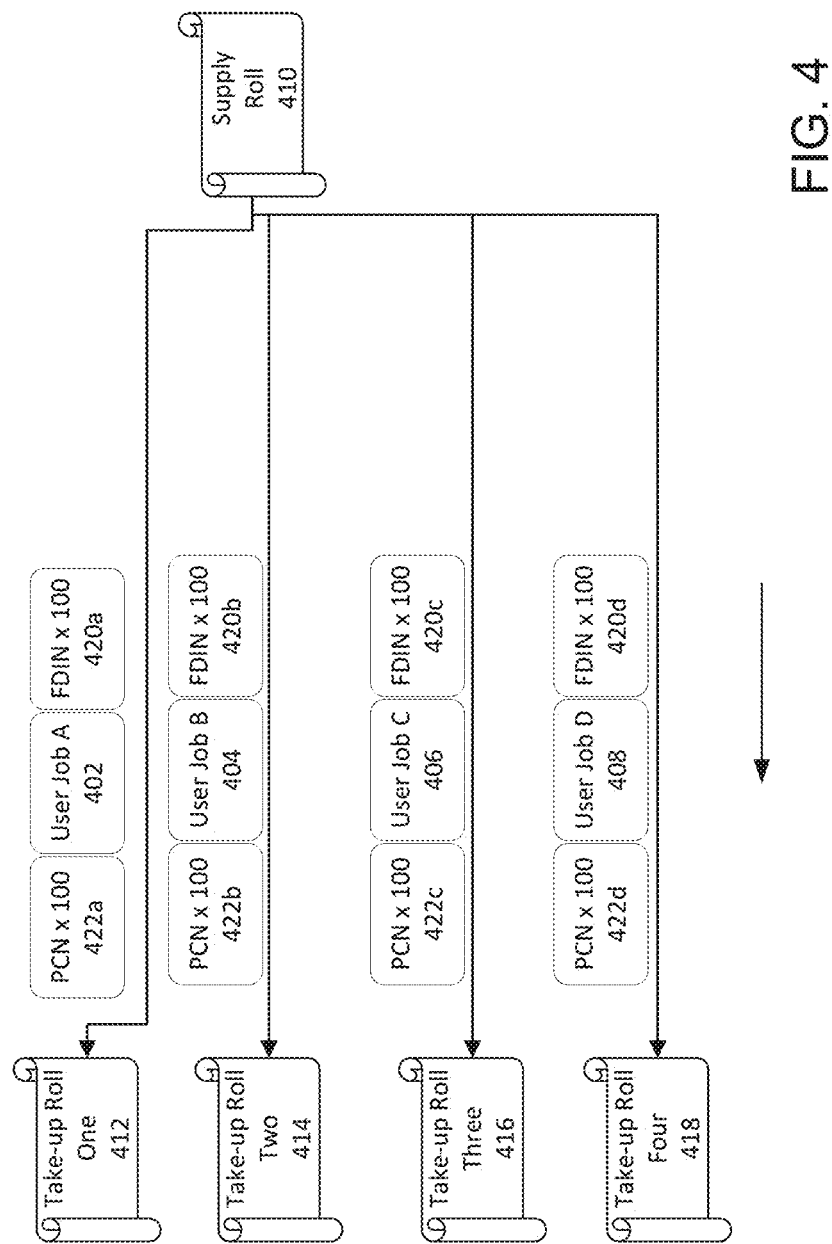
FIGS. 4 and 5 are simple schematic diagrams that illustrate examples of a system for printing with media roll changes and nonproduction frames.

FIG. 4 is a simple schematic diagram that illustrates an example of printing with media roll changes and nonproduction frames. In this example, set of print jobs (user job A 402, user job B 404, user job C 406, and user job D 408 are received at a printer. Each of user jobs A-D includes production frames, and are to be printed in succession (printing of user job A, then user job B, then user job C, then user job D). In this example each of the user jobs A-D are to be printed upon a web media fed from a same supply roll 410.

In this example, user jobs A-D are to be printed with take-up media roll changes occurring during printing. The media fed from supply roll 410 is to be spliced, e.g., at splice lines, such that user job A 402 is wound upon a take-up roll one 412, user job B 404 is wound upon a take-up roll two 414, user job C 406 is wound upon a take-up roll three 414, and user job D 408 is wound upon a take-up roll four 418.

In the example of FIG. 4, the printer is to print a set of FDIN frames (depicted as "FDIN×100") after the printing of each of user job A 402, user job B 404, user job C 406, and user job D 408. The FDIN frames 420a printed after user job A 402 include coded information regarding user job A. The FDIN frames 420b printed after user job B 404 include coded information regarding user job B. The FDIN frames 420c printed after user job C 406 include coded information regarding user job C. The FDIN frames 420d printed after user job D 408 include coded information regarding user job D. The coded information regarding user jobs A-D is for reading by a scanner at a finishing device that is not in-line with the printer.

In this manner, when the media of take-up roll one 412 is unwound at a finishing device, the associated FDIN frames will precede user job A 402. The finishing device can then utilize a scanner at the finishing device to read the coded information of the FDIN frames to provide finishing instructions applicable to user job A 402 to the finishing device. Similarly, when the media of each of take-up rolls two through four are unwound at a finishing device, the associated FDIN frames will precede the applicable user job. The finishing device can then utilize the scanner at the finishing device to read the coded information of the FDIN frames to provide finishing instructions applicable to the user job to the finishing device. The finishing device may modify settings of the finishing device for performing a post-printing action upon subject production frames of user jobs A, B, C and/or D based upon the reading of the coded information of the FDINs.

Continuing with the example of FIG. 4, the printer is to print a set of PCN frames ("PCN×100") before the printing of each of user job A 402, user job B 404, user job C 406, and user job D 408. In other examples, the PCN frames may be printed after each of user jobs A-D. The PCN frames 422a-c each include a printer diagnostic. A scanner at the printer is caused to capture the printer calibration diagnostics in PCN frames 422a before the media is spliced to be stored on take-up roll one 412. The scanner is caused to capture the printer calibration diagnostics in PCN frames 422b before the media is spliced to be stored on take-up roll two 414. The scanner is caused to capture the printer calibration diagnostics in PCN frames 422c before the media is spliced to be stored on take-up roll three 416. The scanner is caused to capture the printer calibration diagnostics in PCN frames 422d before the media is spliced to be stored on take-up roll four 418. In this example, calibration operations are to be performed at the printer utilizing data or attributes captured from each of the printer calibration diagnostics included within the PCN frames 422a-d.

Figure 5:
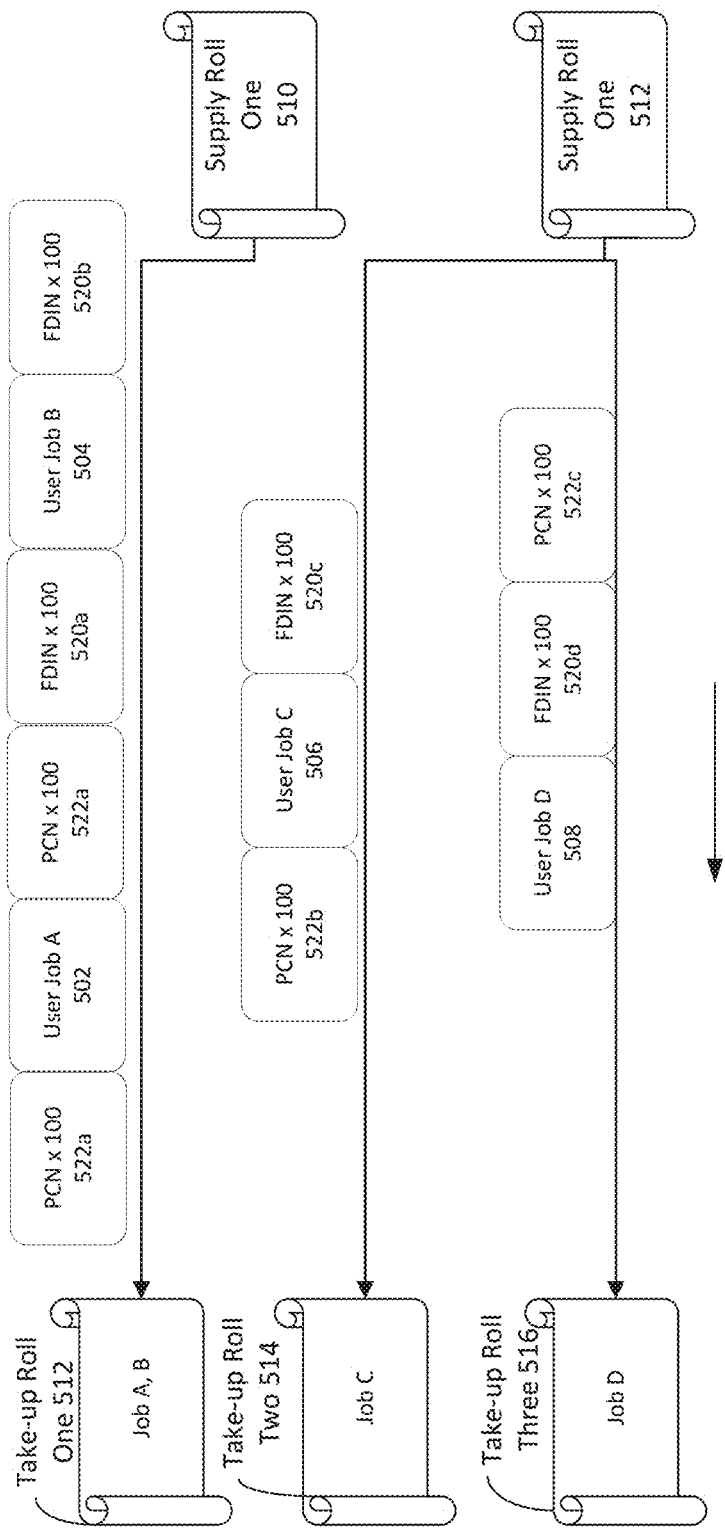

FIG. 5 is a simple schematic diagram that illustrates an example of printing with media roll changes and nonproduction frames. In this example, a set of print jobs (user job A 502, user job B 504, user job C 506, and user job D 508) are received at a printer. Each of user jobs A-D includes production frames, and are to be printed in succession (printing of user job A, then user job B, then user job C, then user job D). In this example each of the user jobs A and B are to be printed upon web media fed from a supply roll one 510, and user jobs C and D are to be printed upon web media fed from a supply roll two 512.

In this example, user jobs A-D are to be printed with take-up media roll changes occurring during printing. The media fed from supply roll one 510 is to be spliced, e.g., at splice lines, such that user job A 502 and user job B 504 are wound upon a take-up roll one 512. The media fed from supply roll two 512 is to be spliced such that user job C 506 is wound upon a take-up roll two 514, and user job D 508 is wound upon a take-up roll three 516.

In the example of FIG. 5, the printer is to print a set of FDIN frames (depicted as "FDIN×100") after the printing of each of user jobs A-D. The FDIN frames 520a printed after user job A 502 include coded information regarding user job A. The FDIN frames 520b printed after user job B 504 include coded information regarding user job B. The FDIN 520c frames printed after user job C 506 include coded information regarding user job C. The FDIN frames 520d printed after user job D 508 include coded information regarding user job D. The coded information regarding user jobs A-D is for reading by a scanner at a finishing device that is not in-line with the printer.

In this manner, when the media of take-up roll one 512 is unwound at a finishing device, the associated FDIN frames will precede user job A 502 and user job B. The finishing device can then utilize a scanner at the finishing device to read the coded information of the FDIN frames to provide finishing instructions applicable to user job A 502 and user job B to the finishing device. Similarly, when the media of each of take-up roll two 514 and take-up roll three 516 are unwound at a finishing device, the associated FDIN frames will precede the applicable user job. The finishing device can then utilize the scanner at the finishing device to read the coded information of the FDIN frames to provide finishing instructions applicable to the applicable user jobs to the finishing device.

Continuing with the example of FIG. 5, the printer is to print a set of PCN frames ("PCN×100") 522a-c before and/or after the printing of each of user job A 502, user job B 504, user job C 506, and user job D 508. The PCN frames 522a-c each include a printer diagnostic. A scanner at the printer is caused to capture the printer calibration diagnostics in PCN frames 522a before the media is spliced to be stored on take-up roll one 512. The scanner is caused to capture the printer calibration diagnostics in PCN frames 522b before the media is spliced to be stored on take-up roll two 514. The scanner is caused to capture the printer calibration diagnostics in PCN frames 522c before the media is spliced to be stored on take-up roll three 516. In this example, the printer is to perform calibration operations (e.g., color correction, registration or verification operations) utilizing data or attributes captured from each of the printer calibration diagnostics included within the PCN frames 522a-c.

Figure 6:
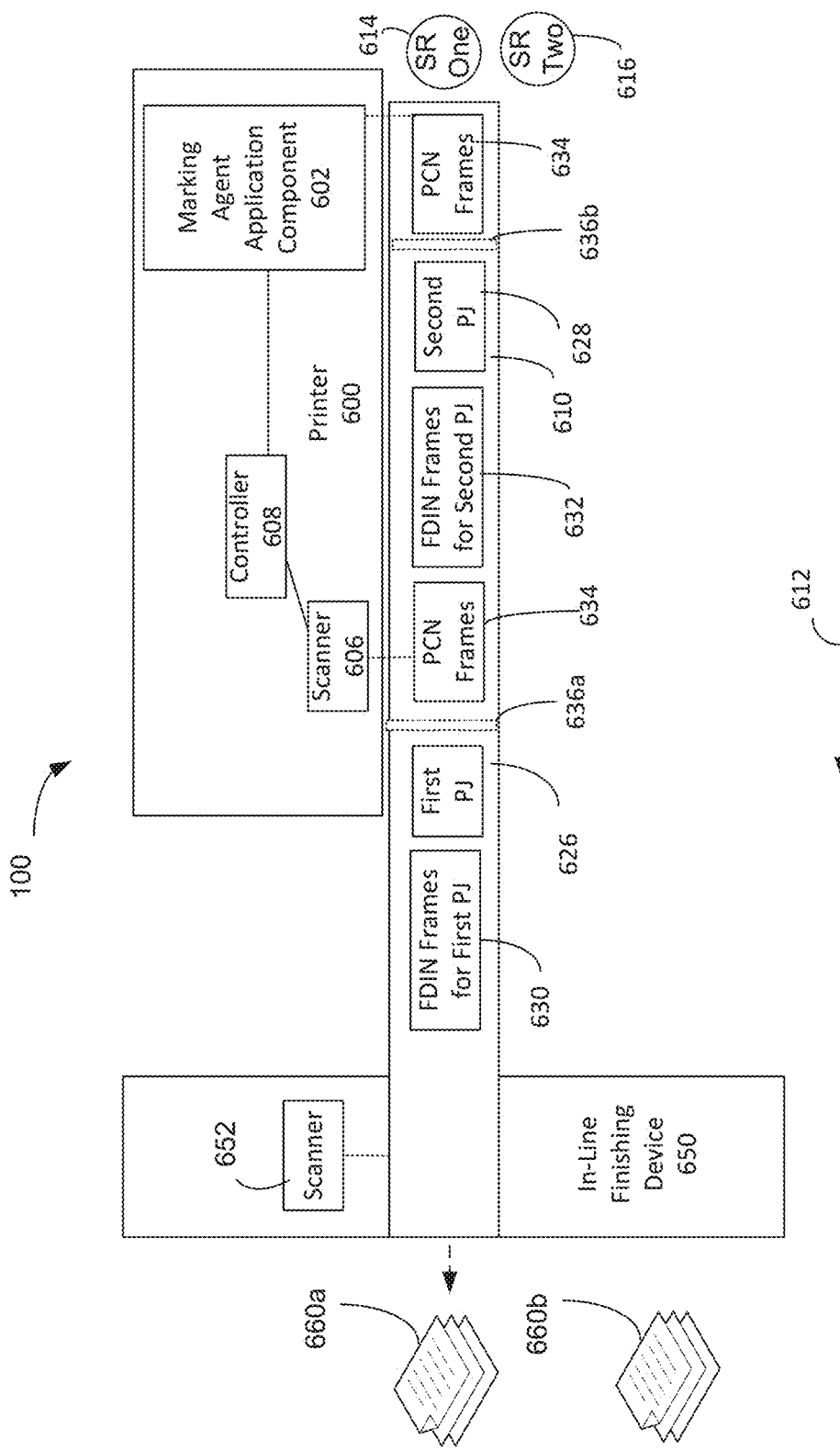
FIG. 6 is a simple schematic diagram that illustrates an example of a system for printing with media roll changes and nonproduction frames wherein a finishing device is in-line with the printer.

FIG. 6 illustrates another example of a system for printing with media roll changes and nonproduction frames. In this example, printer 600 includes a marking agent application component 602, a scanner 606, and a controller 608. In this example, printer 600 is to print upon a web media 610, wherein the web media can be fed to or though printer 600 in a web direction 612 from supply roll one 614 and/or supply roll two 616.

Marking agent application component 602 is to form images upon the web media 610 in accordance with received print jobs. Printer 600 may include media transport components, e.g. rollers, to cause movement of web media 610 in the web direction 612 past the marking agent application component during a printing operation. Scanner 606 is positioned adjacent to web media 610 to face the web media. Controller 608 represents a combination of hardware and programming that is to control part, or all, of the components and print process at printer 600, including controlling system 100 for printing with media roll changes and nonproduction frames at printer 600.

Continuing with the example of FIG. 6, controller 608 is to receive a first print job and a second print job for printing. Controller 608 is to determine a supply media roll change is to occur during the printing of the first and second print jobs. In this example the media roll change may be, or include, one or more supply roll changes as between supply roll one 614 and supply roll two 616. In a particular example, the supply media roll change may include splicing media so as to switch media feeding as between any of supply roll one 614 and supply roll two 616, the splicing creating one or more splice lines 636a 636b in the web media 610. In examples, the supply roll changes are to occur without interrupting printing of the first and second print jobs 626 628, and such that no portion of a production frame of the first and second print jobs 626 628, a FDIN frame (e.g., FDIN frames 630 for the first print job or FDIN frames 632 for the second print job), or any PCN frame (e.g. PCN frames 634) is to be printed on a splice line In the example of FIG. 6, controller 608 is to cause the marking agent application component to print FDIN frames 630 and FDIN frames 632 upon the media 610. In this example, FDIN frames 630 include coded information to be read at a finishing device (not shown in FIG. 6), the coded information for modifying a setting of the finishing device with respect to the printed first print job 626. FDIN frames 632 include coded information to be read at the finishing device, the coded information for modifying a setting of the finishing device with respect to the printed second print job 628.

The coded information is to be read at a scanner at the finishing device, so as to cause the modification of the finishing device. In examples, the modification of the finishing device may change in settings of the finishing device to act upon the printed first print job 626 and second print job 628 (e.g., settings for a cutting, folding, stapling, or sorting action to be taken by the finishing device). In particular examples, the coded information included within FDIN frames 630 and/or FDIN frames 632 may include diagnostic or calibration patterns. In these particular examples the modification of the finishing device may be a change in settings based upon a calibration operation at the finishing device that utilizes the diagnostic or calibration patterns.

Continuing at FIG. 6, controller 608 is to cause printer 600 to print PCN frames 634, each of which includes a printer calibration diagnostic. In this example PCN frames 634 are printed after the printing of the first print job 626 and FDIN frames 630, and before the printing of the second print job 628 and FDIN frames 632. Controller 608 causes scanner 606 to scan the printer calibration diagnostic included in PCN frames 634, and generates scan data representative of the printer calibration diagnostic. Controller 214 in turn causes a calibration operation to be performed at printer 600 utilizing the scan data.

In this example, a finishing device 650 is positioned in-line and downstream relative to printer 600. The FDIN frames 630 for the first print job 626 include an instruction for modification of finishing device 650 that is to perform an action upon the received print job after the job is printed. The instruction is to be read by a scanner 652 at finishing device 650, so as to cause a modification or change in a setting of finishing device 650. In certain examples, the modification or change in settings of the finishing device is to enable finishing device 650 to set knives, blades, turn rollers, stackers, sorters, etc. to positions to handle post-printing actions on the printed job to produce a first finished job 660a. In examples first finished job 660a may be, but are is not limited to, cut pages for a magazine or newspaper, cut coupons, or folded and stapled direct mailing materials.

In this example, the FDIN frames 632 for the second print job 628 include an instruction for modification of finishing device 650. The instruction is to be read by scanner 652 so as to cause a modification or change in a setting of finishing device 650. In certain examples, the modification or change in settings of the finishing device is to enable finishing device 650 to set device parameters for handling of second print job 628 produce a second finished job 660b.

In other examples, the instruction included in the FDIN frames 630 or 632 may include a diagnostic or calibration pattern, and the modification of the finishing device may be in response to a calibration operation at finishing device 650.

Continuing at FIG. 6, controller 608 is to cause printer 600 to print PCN frames 634 that includes a printer calibration diagnostics. Controller 608 is to cause a scanner 606 at printer 600 to capture the printer calibration diagnostics, and is to perform calibration operations at printer 600 utilizing data or attributes captured from the printer calibration diagnostics.

FIGS. 7A-7C are simple schematic diagrams that illustrate examples of a FDIN frame having an instruction for modification of a non-printing apparatus. FIG. 7A illustrates a FDIN frame 750 that includes a machine-readable code 752 and set of color calibration tiles 754. Machine readable code 752 is to be read by a scanner to inform a finishing device that the current frame is a non-production frame including color calibration tiles 754 for performing a color accuracy calibration at the finishing device. As used herein a "machine readable code" may be or include, but is not limited to, a QR code or a bar code. In examples, the color accuracy calibration may be to ensure the printer produces a color that is sufficiently similar to a target, e.g., a Pantone. In other examples, the color accuracy calibration may be to ensure the printer prints colors sufficiently similar to the colors printed by the printer in a prior print job. In yet another example, the color accuracy calibration may be to ensure the printer is printing colors sufficiently similar to the colors that are being printed by another printer. In other examples, a user at a downstream non-printing device might pull FDIN frame 750 from the press for visual inspection or to utilize and offline spectrophotometer or other sensor or scanner to verify the press is printing colors correctly.

FIG. 7B illustrates a FDIN frame 760 that includes a machine-readable code 762 and set of alignment fiducials 764. Machine readable code 762 is to be read by a scanner to inform a downstream finishing device that the current frame is a non-production frame including alignment fiducials for 764 for performing an event (e.g. a cutting, folding, or stapling event) at the finishing device. As used herein, a "fiducial" refers generally to a geometrical shape or other visual feature that may be placed in the focal plane of a sensor or scanner and used as a reference point for measuring a distance. In this particular example, the fiducials are cross shaped, but in other examples fiducials may be, but are not limited to, a rectangle, oval, line segment, dot, or spot shape fiducial.

FIG. 7C illustrates a FDIN frame 770 that includes a first machine-readable code 772, a second machine-readable code 774, a set of color calibration fiducials 776 and a set of alignment fiducials 778. First machine readable code 772 and second machine readable code 774 are to be read by a scanner at a downstream finishing device to inform the finishing device that the current frame is a non-production frame including color calibration fiducials 776 and alignment fiducials for 778 for aligning a print job such that the finishing device can perform a cutting, sorting, stapling, or other post-print action upon the print job.

Figure 8A:
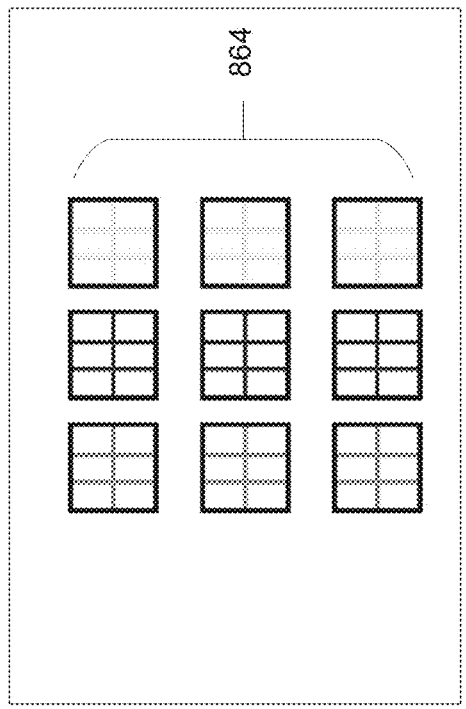
FIGS. 8A-8C are simple schematic diagrams that illustrate examples of a printer calibration nonproduction frame having a diagnostic, the diagnostic scannable to generate scan data for use in a printer calibration operation.

FIGS. 8A-6C are simple schematic diagrams that illustrate examples of PCNs having a diagnostic, the diagnostic scannable to generate scan data for use in a printer calibration operation. FIG. 8A illustrates a PCN frame 850 that includes a diagnostic with a set of color calibration tiles 854. Color calibration tiles 854, when read by a scanner at a printer are to cause the printer to adjust color settings at the printer.

Figure 8B:
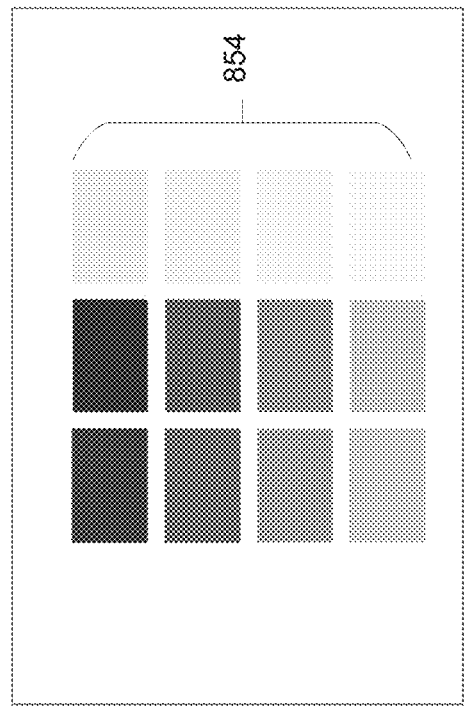

FIG. 8B illustrates a PCN frame 860 includes a diagnostic with set of image alignment fiducials 864, that when read by a scanner at the printer is to cause the printer to calibrate image alignment, e.g. how marking agent is applied to a substrate to precisely place a printed image upon the web media.

Figure 8C:
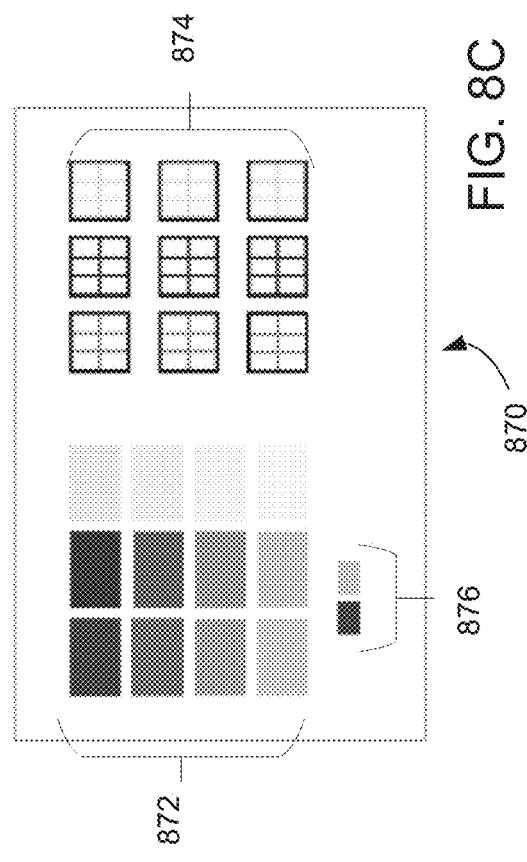

FIG. 8C illustrates a PCN frame 870 that includes a diagnostic with set of color calibration tiles 872, a set of image alignment fiducials 874, and a set of front-to-back image alignment fiducials 876. Color calibration tiles 872 when read by the scanner at the printer are to cause the printer to adjust color settings at the printer. Set of image alignment fiducials 874, when read by the scanner at the printer are to cause the printer to calibrate image alignment, e.g. how marking agent is applied to a substrate to precisely place a printed image upon a first side of the web media). Set of front-to-back image alignment fiducials 876 when read by the scanner at the printer are to cause the printer to calibrate image alignment as between first and second sides of the web media, e.g. where the printer is a duplex printer.

Figure 9:
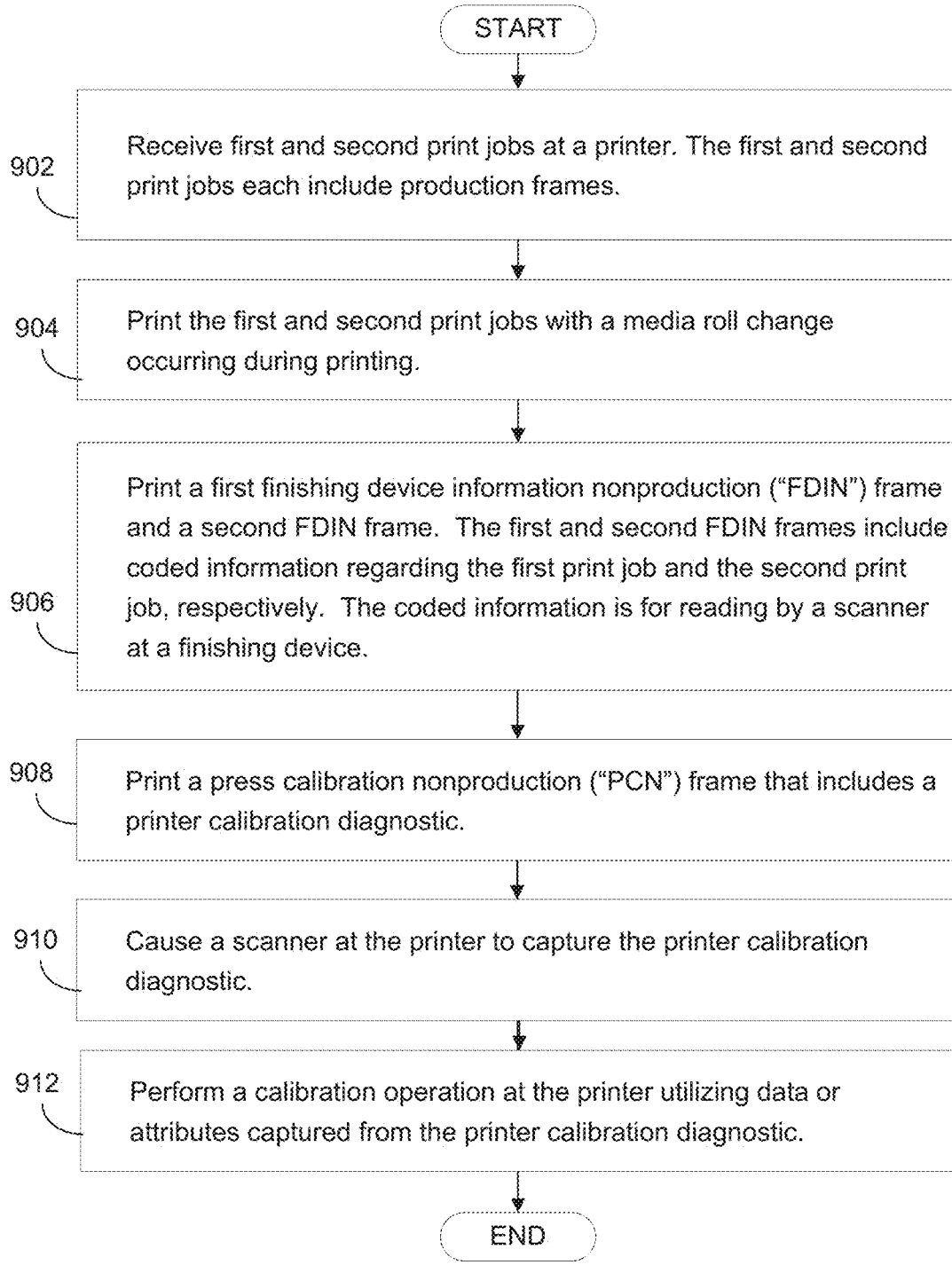
FIG. 9 is a flow diagram depicting an example implementation of a method for printing with media roll changes and nonproduction frames.

FIG. 9 is a flow diagram of implementation of a method for printing with media roll changes and nonproduction frames. First and second print jobs are received at a printer. The first and second print jobs each include production frames (block 902). Referring back to FIGS. 1 and 2, job receipt engine 102 (FIG. 1) or job receipt module 202 (FIG. 2), when executed by processing resource 240, may be responsible for implementing block 902.

The first and second print jobs are printed with a media roll change occurring during printing (block 904). Referring back to FIGS. 1 and 2, job print engine 104 and media roll change engine 106 (FIG. 1), or job print module 204 and media roll change module 206 (FIG. 2), when executed by processing resource 240, may be responsible for implementing block 904.

A first finishing device information nonproduction ("FDIN") frame and a second FDIN frame are printed. The first and second FDIN frames including coded information regarding the first print job and the second print job, respectively. The coded information is for reading by a scanner at a finishing device (block 906). Referring back to FIGS. 1 and 2, FDIN frame engine 108 (FIG. 1) or FDIN frame module 208 (FIG. 2), when executed by processing resource 240, may be responsible for implementing block 906.

A press calibration nonproduction ("PCN") frame that includes a printer calibration diagnostic is printed (block 908). Referring back to FIGS. 1 and 2, PCN engine 110 (FIG. 1) or PCN module 210 (FIG. 2), when executed by processing resource 240, may be responsible for implementing block 908.

A scanner at the printer is caused to capture the printer calibration diagnostic (block 910). Referring back to FIGS. 1 and 2, scanning engine 112 (FIG. 1) or scanning module 212 (FIG. 2), when executed by processing resource 240, may be responsible for implementing block 910.

A calibration operation is performed at the printer utilizing data or attributes captured from the printer calibration diagnostic (block 912). Referring back to FIGS. 1 and 2, calibration engine 114 (FIG. 1) or calibration module 214 (FIG. 2), when executed by processing resource 240, may be responsible for implementing block 912.

FIGS. 1-9 aid in depicting the architecture, functionality, and operation of various examples. In particular, FIGS. 1-8 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor-based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electro-magnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagram of FIG. 9 shows specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A printing method, comprising:
    printing a first print job on web media;
    printing a first finishing device information nonproduction (FDIN) frame on the web media after the first print job is printed;
    printing a second print job on the web media after the first FDIN frame; and
    printing a second FDIN frame on the web media after the second print job, wherein the first and second print jobs are performed with a media roll change, wherein the media roll change is comprised of splicing media from a first supply roll to a second supply roll or splicing media from a first take-up roll to a second take-up roll, and wherein the first FDIN frame includes coded information indicating instructions for finishing the first print job by a finishing device and the second FDIN frame includes coded information indicating instructions for finishing the second print job by the finishing device.

2. The printing method of claim 1, wherein the first FDIN frame precedes a production frame of the first print job and the second FDIN frame precedes a production frame of the second print job when the web media is unwound at the finishing device.

3. The printing method of claim 1, wherein:
    the web media includes at least one splice line, and
    the first print job and the first FDIN frame are printed in advance of the at least one splice line and the second print job and the second FDIN frame are printed after the at least one splice line.

4. The printing method of claim 1, further comprising: printing a press calibration nonproduction (PCN) frame on the web media at a location between the first FDIN frame and a production frame of the first print job.

5. The printing method of claim 4, wherein the PCN frame is printed between two splice lines on the web media.

6. The printing method of claim 4, wherein: the PCN frame includes a printer calibration diagnostic which includes information that indicates how a calibration operation is to be performed.

7. The printing method of claim 1, wherein the coded information indicates a setting of the finishing device.

8. The printing method of claim 1, wherein the first FDIN frame includes a diagnostic or calibration pattern.

9. The printing method of claim 1, wherein the first FDIN frame includes one or more alignment fiducials.

10. The printing method of claim 1, wherein the first FDIN frame includes one or more color calibration fiducials.

11. A printing method, comprising:
    printing a first finishing device information nonproduction (FDIN) frame on web media;
    printing a first print job on web media after the first FDIN frame;
    printing a second FDIN frame on the web media after first FDIN frame; and
    printing a second print job on the web media after the second FDIN frame; and
    wherein the first and second print jobs are performed with a media roll change,
    wherein the media roll change is comprised of splicing media from a first supply roll to a second supply roll or splicing media from a first take-up roll to a second take-up roll, and
    wherein the first FDIN frame includes coded information indicating instructions for finishing the first print job by a finishing device and the second FDIN frame includes coded information indicating instructions for finishing the second print job by the finishing device.

12. The printing method of claim 11, wherein the finishing device receives the first FDIN frame before the first print job.

13. An apparatus comprising:
    a memory to store instructions; and
    a controller to execute the instructions to control:
        printing a first print job on web media;
        printing a first finishing device information nonproduction (FDIN) frame on the web media after the first print job is printed;
        printing a second print job on the web media after the first FDIN frame; and
        printing a second FDIN frame on the web media after the second print job,
        wherein the first and second print jobs are performed with a media roll change,
        wherein the media roll change is comprised of splicing media from a first supply roll to a second supply roll or splicing media from a first take-up roll to a second take-up roll, and
        wherein the first FDIN frame includes coded information indicating instructions for finishing the first print job by a finishing device and the second FDIN frame includes coded information indicating instructions for finishing the second print job by the finishing device.

14. The apparatus of claim 13, wherein:
    the web media includes at least one splice line, and
    the controller is to control printing of the first print job and the first FDIN frame in advance of the at least one splice line and printing of the second print job and the second FDIN frame after the at least one splice line.

15. The apparatus of claim 13, wherein:
the controller is to control printing of a press calibration nonproduction (PCN) frame on the web media at a location between the first FDIN frame and a production frame of the first print job,
wherein the PCN frame includes a printer calibration diagnostic which includes
information that indicates how a calibration operation is to be performed.

* * * * *